൧

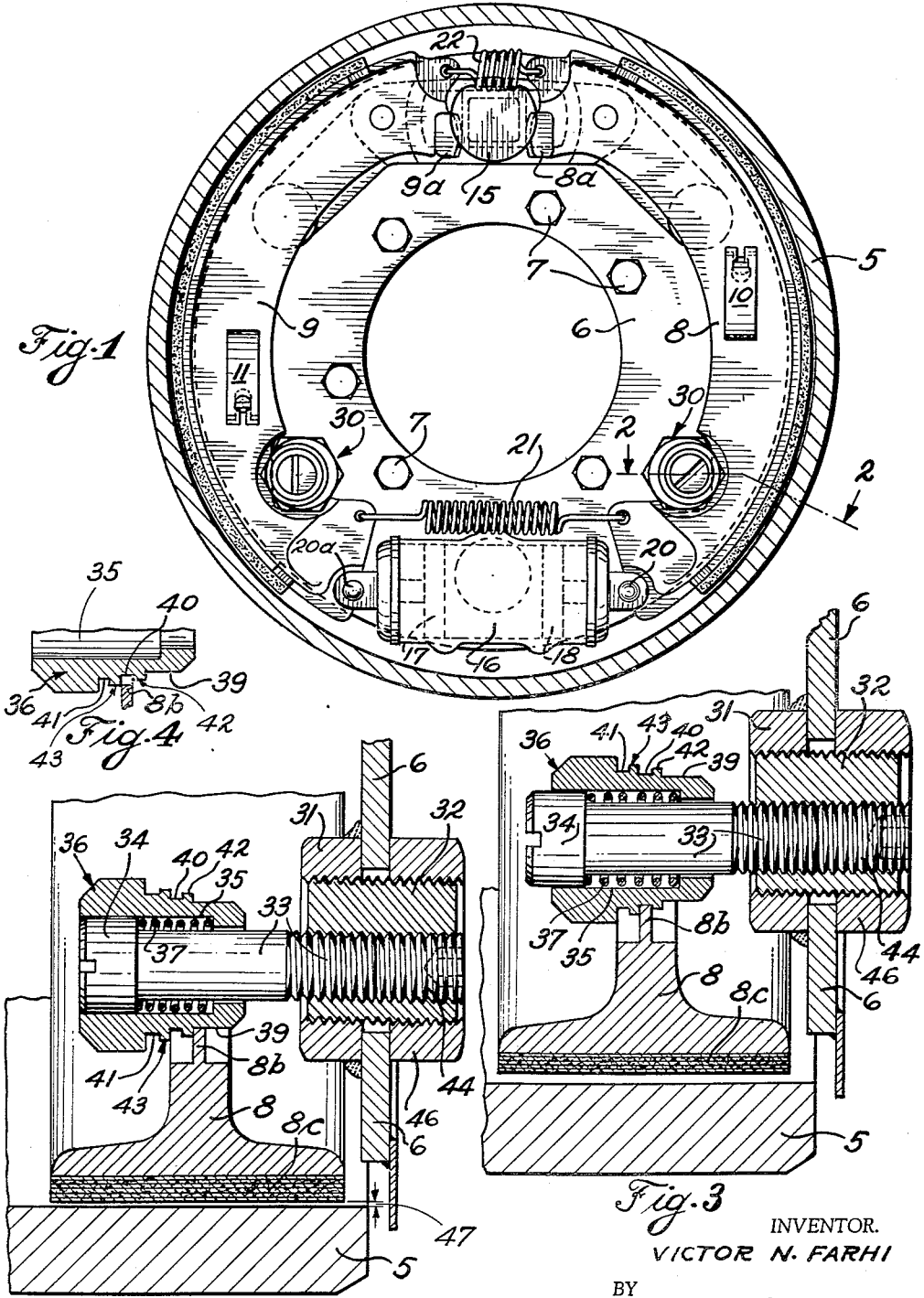

United States Patent Office 2,961,075
Patented Nov. 22, 1960

2,961,075

SELF-ADJUSTING BRAKE

Victor N. Farhi, Cleveland, Ohio, assignor to Towmotor Corporation, Cleveland, Ohio, a corporation of Ohio Filed Jan. 15, 1959, Ser. No. 787,027

6 Claims. (Cl. 188—79.5)

This invention relates to vehicle brakes and more particularly to a brake of the expanding shoe and drum type wherein the slack in the brake due to wear of the friction material is taken up by a device which does not require manual adjustment.

A type of brake enjoying wide current use for vehicles such as lift trucks, automobiles, and the like, is the hydraulic brake which includes a pair of arcuate shoes mounted on the brake backing frame and arranged to be moved away from each other by hydraulic cylinder means so as to expand with respect to the brake drum carried by the vehicle wheel and thereby frictionally retard the rotation of the drum. The brake shoes in this type of brake include a layer of friction material and, as this friction material wears by contact with the interior of the brake drum, an increasing amount of movement of the brake shoe is required to effect the application of the brake.

Numerous expedients have been provided for minimizing the travel of the brake shoes so as to limit the pedal travel required by the operator. Usually such brake adjusting devices include an abutment which is manually adjusted with respect to the brake backing frame and this abutment is in the path of the brake shoe in its travel toward and away from the drum. Some of the designs of the prior art provide that the position of the abutment may be changed by manual adjustment as by the use of a key or other cam moving means. Most automotive brakes include adjusting devices that may be reached from the underside of the vehicle by the vehicle serviceman.

Numerous expedients have been proposed for automatically and progressively changing the travel limit of the brake shoe as it is retracted. Some of such devices include cams, pawl and ratchet means and spring-pressed wedges having steps thereon to establish different retracted limits for the brake shoe. The prior art devices have included movable pieces which were of such mass and upon which were imposed such inertia loads that the automatic adjustment became erratic and uncertain when subjected to actual operating conditions. The experience with the prior art automatic adjusters is such that automatic devices have not been adopted for regular commerical production.

According to my invention I have arranged an abutment for the brake shoe in its retracted position so that the retracting load is transmitted directly to a rigid stud carried by the brake backing frame normal to the movement of the brake shoe. By providing a single moving part having different diameters on its exterior co-axially of the stud and between the brake shoe and the stud, I have provided an automatic adjustment which avoids the defects found in the prior art automatic adjusters. It is among the objects of my invention to provide a brake adjustment device wherein a stud is mounted on the brake backing frame so as to extend into the path of travel of the brake shoe and wherein the stud is provided with a sleeve mounted for co-axial movement along the stud and the sleeve is provided with different diameters on its exterior so that its position axially along the stud will determine the limit of retraction of the brake shoe.

It is a further object of my invention to provide a brake adjuster according to the preceding object wherein the sleeve having the different diameter abutment portions is slidable and rotatable on the stud and wherein the sleeve is spring-biased axially of the stud so as to urge the greater diameter portion of the sleeve into the path of the brake shoe.

Further objects and advantages relating to a construction of compact design, simplicity of construction and flexibility in use will appear from the following description and the accompanying drawings wherein:

Fig. 1 is an elevation with parts in section of a brake assembly made according to my invention;

Fig. 2 is a sectional view taken on the plane indicated at 2—2 of Fig. 1 showing the relative positions of the brake shoe and sleeve prior to wear of the frictional material on the brake shoe;

Fig. 3 is a view similar to Fig. 2 showing the relative positions of the brake shoe and sleeve after the friction material is partly worn away and after an automatic adjustment has been made; and Fig. 4 is a view with parts broken away, showing the relationship between the adjusting sleeve and the brake shoe when the brake is applied.

The brake backing plate indicated at 6 is secured by means of bolts 7 to the axle housing (not shown) in the usual manner. It will be understood that the circular opening in the brake backing plate 6 permits the drive axle to extend through the plate and be secured to the usual vehicle wheel (not shown).

A right-hand brake shoe 8 and a left-hand brake shoe 9 are mounted on the brake backing plate 6 and are retained by means of spring clips 10 and 11. A shoe anchor or fulcrum 15 is carried by the brake backing plate and, as shown, is provided with opposite flat wall portions against which the rocker 8a on shoe 8 may pivot. A similar rocker shoe 9a carried by the brake shoe 9 bears against a similarly flat wall portion on the anchor 15. The ends of the shoes as at 8a and 9a will be referred to as the pivoted ends of the shoes. A hydraulic cylinder assembly 16 is carried by the brake backing plate 6 at the lower side of the assembly and a pair of pistons indicated at 17 and 18 are arranged to expand the brake shoes by means of the pivotal connection between the piston rods and the shoes at 20 and 20a.

It will be understood by those skilled in the art that when hydraulic brake fluid is directed into the cylinder 16, the pistons 17 and 18 are moved away from each other in an amount corresponding to the volume of hydraulic fluid forced into the cylinder 16. The introduction of the hydraulic fluid is determined by a master cylinder which is actuated by a foot pedal convenient to the vehicle operator. A tension spring 21 is secured at its opposite ends to each of the brake shoes 8 and 9 so as to normally pull the shoes to a retracted position. A tension spring 22 is secured to the pivoted ends of the shoes and normally biases the rocker portions 8a and 9a against the anchor 15.

The retracting movement of the shoes 8 and 9 in response to the return spring 21 is limited by the abutment assembly indicated in its entirety as at 30. There is one abutment assembly for each of the shoes 8 and 9 and, since they are identical, only one of the abutment assemblies will be described in detail.

The brake backing plate 6 is apertured as best shown in Fig. 2 and an interiorly threaded nut 31 is welded to the brake backing plate 6. An eccentric member 32 is threaded on its exterior to enter the threads of the nut 31 and is threaded on its interior to receive the stud 33. By turning the eccentric member 32 within the nut 31 it will be noted that the axis of the interiorly threaded portion on 32 is moved toward or away from the brake shoe due to the eccentricity between the exterior of the member 32 and the interior bore thereof. This arrangement provides for the preliminary positioning of the stud 33 relative to the trailing edge portion 8b of the brake shoe 8.

The stud 33 is provided with a cylindrical head portion 34 arranged within the bore 35 of an adjusting sleeve 36. The annular chamber formed between the bore 35 and the shank of stud 33 houses a spring 37 normally biasing the sleeve toward the brake backing plate 6 of the brake assembly. The exterior of the sleeve 36 is provided with a least diameter portion as at 39 and an intermediate diameter portion as at 40 and a large diameter portion as at 41. This provides for three different adjusted positions. At the juncture between diameters 39 and 40 an annular shoulder 42 is provided and similarly at the juncture between diameters 40 and 41 a shoulder 43 is provided. It will be observed that as the brake shoe 8 is retracted from the brake drum, it will be limited to its inward travel by coming in contact with the adjusting sleeve 36. If the adjusting sleeve 36 is in the position shown in Fig. 2, as would be the case if the friction material 8c were new, the total back travel of the brake shoe is sufficient to provide the clearance 47 between the drum 5 and friction material 8c. When, however, the friction material has worn, as illustrated in Fig. 3, the greater travel required of the shoe 8 to contact the drum 5 causes the trailing edge 8b to exceed the height of shoulder 42. This relative motion of 8b with respect to 42 permits the sleeve 36 to be biased toward the brake backing plate 6. Thus the intermediate diameter portion 40 is presented to the trailing edge of the brake shoe in its retracted position. It will be noted that the surfaces at 40 and 41 are recessed with respect to their shoulders 42 and 43, respectively, to insure running clearance between brake drum 5 and lining 8c upon retraction of shoe 8.

Fig. 4 shows the amount of travel between the diameter portion 40 and the trailing edge of the brake shoe 8b when the brake is applied. When the friction material in the shoe has worn beyond that indicated in Fig. 3, the sleeve 36 will again be moved inwardly toward the brake backing plate 6 and thus present the large diameter portion of the sleeve as at 41 to the trailing edge of the brake shoe. A shoulder 43 is provided at an adjacent diameter change and, as shown in Fig. 4, no "automatic" adjustment occurs until the brake wear exceeds the height of the shoulder 43. This eliminates any "hunting" action or tendency for the brake to hesitate between adjustments. After each adjustment the total travel of the brake shoe is minimized and no manual adjustment of the device is necessary to maintain the brake shoe travel at its minimum. A locking nut 46 is threaded onto the member 32 when the brake is initially adjusted in working position and a set screw 44 is drawn down into the threaded bore of the member 32 so as to securely lock the stud 33 in its fixed position on the brake backing plate 6.

Preferably all parts of the brake adjusting device are electrofilmed with a lubricating agent prior to assembly to prevent corrosion and insure continuous and positive operation.

The height of the flange 42 adjacent to the land 39 slightly exceeds the travel of the shoe as originally adjusted for clearance 47 so that some wear on the brake lining must occur before the flange 42 may move axially beneath the edge of the shoe when the shoe is applied against the drum. The flange 43 is similarly proportioned with respect to the land 40 so that a similar amount of wear will occur before the next adjustment is made. It will be understood that although three levels of operation as determined by lands 39, 40 and 41 are shown, any number of adjusted positions may be obtained by following this construction shown.

Although I have shown and described one form of my invention in considerable detail, it will be understood by those skilled in the art that numerous modifications may be made therein without departing from the scope of my invention as defined in the following claims.

What is claimed is:

1. A slack adjuster for a brake having a brake backing plate, a brake drum, an arcuate brake shoe mounted on the brake backing plate for pivotal movement toward and away from the interior of the brake drum, brake actuating means connected to the shoe for moving the shoe into frictional engagement with the interior of the drum, and brake return means connected to the shoe to bias the brake shoe to retracted position out of contact with the drum, said slack adjuster comprising a stud, means for mounting said stud on the brake backing plate to extend therefrom into the path of the shoe in its retracting travel, said stud mounting means having provision for eccentric rotative adjustment of the stud, a sleeve mounted on the stud for axial sliding movement along the stud, said sleeve at successive locations axially therealong having exterior cylindrical portions of different diameter, and spring means normally biasing said sleeve axially along the stud in one direction.

2. A slack adjuster for a vehicle brake having a brake backing plate, a shoe pivotally mounted on the brake backing plate, return spring means biasing said shoe about its pivot in one direction and hydraulic actuating means to move the shoe in the opposite direction, said slack adjuster comprising an exteriorly threaded bushing constructed and arranged to be mounted on the brake backing plate, said bushing having a threaded bore therethrough eccentric of the axis of the bushing, a stud having a threaded shank received in the threaded bore of the bushing, said stud having an inner portion positioned to extend into the path of retracting movement of the brake shoe when said slack adjuster is mounted on the brake backing plate, a sleeve on said inner portion of the stud mounted for axial sliding movement along the stud toward and away from the brake backing plate, said sleeve at successive locations axially therealong having exterior pockets of successively larger diameters whereby when the pocket of the least diameter is aligned with the brake shoe the brake shoe has its maximum retraction in response to the return spring means and spring means biasing the sleeve in one direction axially along the stud so as to position a larger diameter pocket in the path of the shoe and thereby reduce the retracting movement of the shoe in response to said return spring means when wear on the brake shoe results in greater clearance between the brake shoe and the sleeve.

3. A slack adjuster for a vehicle brake having a brake backing plate, a pair of brake shoes pivotally carried by the brake backing plate, a brake drum surrounding the brake shoes, hydraulic means to expand the brake shoes outwardly into contact with the interior of the drum, and spring means to retract the brake shoes away from the interior of the drum, said slack adjuster comprising a bushing having provision to be mounted on the brake backing plate, said bushing having a threaded bore therethrough eccentric of the central axis of the bushing, a stud having a head and a threaded shank, said threaded shank being mounted in the bore of the bushing and positioned to project from the brake backing plate into the path of the brake shoe in the movement of the brake shoe in response to said spring means, a sleeve slidably mounted on said stud for movement axially therealong, said sleeve having a bore at one end to slide over the head of said stud, said sleeve having a bearing at the other end thereof to ride on the shank of the stud, and a spring surrounding the stud housed within the sleeve between said bearing and the head of the stud to normally bias the sleeve toward the brake backing plate, the exterior of said sleeve having portions along the axial extent of the sleeve which are of successively larger diameters in a direction away from said bushing whereby excessive travel occasioned by wear of the brake shoe frees the sleeve from engagement with the shoe and the sleeve moves axially toward said bushing to present a larger diameter portion to the brake shoe and thereby take up slack in the brake due to wear of the friction material.

4. A slack adjuster for use with a vehicle brake having a brake backing plate, a pivoted brake shoe mounted on the plate, and return spring means for retracting the brake shoe, said slack adjuster comprising an eccentric bushing having provision to be carried by the brake backing plate, a stud carried by the bushing and positioned to project into the path of the brake shoe in its retracting movement, a sleeve slidably mounted on the stud, and means to bias the sleeve towards said bushing along the stud, said sleeve having a least diameter portion toward the stud and a greater diameter portion away from the stud and an intermediate diameter portion between said first-named portions whereby wear on the friction material of the brake is compensated for by movement of the sleeve toward the stud so as to present a larger diameter portion of the sleeve in the path of the brake shoe.

5. A slack adjuster constructed according to claim 4 wherein a first shoulder is provided between the least diameter portion and the intermediate diameter portion and a second shoulder is provided between the intermediate diameter portion and the greater diameter portion to provide a range of movement of the brake shoe in its retracting movements exceeding the range determined by the diameter of the portions.

6. A slack adjuster for a brake having a brake backing plate, and a brake shoe mounted for movement in one direction to exert a braking action and for retracting movement in the opposite direction, said slack adjuster comprising a support member means for mounting said support member on the brake backing plate, said mounting means having provision for selectively adjusting said support member toward and away from said brake shoe, an adjustment member slidably mounted on said support member to be positioned in the path of retracting movement of the brake shoe, said adjustment member along its length presenting successive external surface portions which face toward the brake shoe and are disposed progressively closer thereto, and means biasing said adjustment member lengthwise to position in the path of retracting movement of the brake shoe the successively closer-disposed external surface portions on said adjustment member to thereby progressively limit the retracting movement of the brake shoe as wear takes place thereon.

References Cited in the file of this patent

UNITED STATES PATENTS

| | | |
|---|---|---|
| 2,011,373 | Owens | Aug. 13, 1935 |
| 2,018,567 | Page | Oct. 22, 1935 |
| 2,030,848 | Boughton et al. | Feb. 18, 1936 |
| 2,228,576 | Marino | Jan. 14, 1941 |
| 2,348,960 | Cowell | May 16, 1944 |
| 2,421,802 | Mould | June 10, 1947 |
| 2,861,657 | Curtis et al. | Nov. 25, 1958 |
| 2,889,015 | White | June 2, 1959 |

FOREIGN PATENTS

| | | |
|---|---|---|
| 1,123,781 | France | June 18, 1956 |